Patented July 24, 1951

2,562,140

UNITED STATES PATENT OFFICE 2,562,140

GELLED DISPERSIONS OF COPOLYMER RESINS

Edwin H. Dafter, Jr., Stamford, Conn., assignor to American Cyanamid Company, New York, N. Y., a corporation of Maine No Drawing. Application June 28, 1947, Serial No. 757,919

11 Claims. (Cl. 260—31.2)

This invention relates to dispersions of gelled copolymer resins in an organic solvent, and the process of effecting said dispersion. More particularly, the invention is related to a dispersion of a polymerizable unsaturated alkyd resin of the polyester type and a copolymerizable reactive material advanced in polymerization to a degree sufficient to effect gellation. Included within the scope of this invention are the various finishes obtained with the dispersion of gelled copolymer.

The present methods of application of copolymer type resins for surface finishing require that the resin first be spread on the object to be coated, and then gelled by the application of heat. The formation of a gel is necessary in order to prohibit flow of resin during pressing operation, in order that a sufficiently thick coating may be obtained. The present methods are not adapted to curved or vertical surfaces, because, on the application of heat, the resin becomes less viscous, and flows. The present invention overcomes the present difficulties by gellation of the resin before application to the surface; and, thus, when heat is applied, no serious decrease in viscosity is realized. Prior art methods require resin application by knife coating and the like, whereas the present invention provides for a material suitable for spray coating technique. In the prior art methods of gellation on the surface to be coated, the gel stage is critical and a great degree of skill is required in order to secure the correct degree of gellation. The present invention overcomes the difficulty and criticalness of the prior art process by allowing a relatively low temperature drying operation which will advance the gel slowly.

Accordingly, an object of this invention is to correct the deficiencies of the present method of surfacing with copolymer resins; and, to provide surface coating agents, particularly adapted to articles of manufacture which require molding or pressing in the final operation.

The foregoing and other advantages and objects are attained by heating a solution of co-reactable materials, including polymerizable unsaturated alkyd resin and a compatible polymerizable reactive material containing the group $CH_2=C<$ and having a boiling point above 100° C. in a suitable organic solvent, in the presence of a small percentage of peroxide catalyst. When the desired degree of gellation has been obtained, the product is cooled and stabilized by a small amount of stabilizing agent.

In providing the components of the copolymer resin, any of the polymerizable unsaturated alkyd resins of the polyester type may be satisfactorily employed. These resins are conveniently obtained by the reaction of polycarboxylic acids with a polyhydric alcohol. Glycols are preferably used as the polyhydric alcohols and examples of these are ethylene glycol, diethylene glycol, triethylene glycol, trimethylene glycol, alpha propylene glycol, octadecandiol, decamethylene glycol, neopentyl glycol, etc. Mixtures of the glycols may be used, and the polyesters may be modified with monohydric alcohol, and/or monobasic acids.

While any of the alpha, beta unsaturated dicarboxylic acids, including maleic acid, itaconic acid, and citranoic acid, may be used, fumaric acid is preferred. Part of the alpha, beta unsaturated dicarboxylic acid may be replaced by other polycarboxylic acids including: succinic acid, adipic acid, sebacic acid, phthalic acid, endomethylene - tetrahydrophthalic anhydride, etc. The use of a dicarboxylic acid which does not contain an alpha, beta unsaturation subject to polymerization is desirable, in order to modify the characteristics of the reactive component with which it is copolymerized, and sometimes to effect compatibility.

The reactive monomeric substances employed in the copolymerization with the unsaturated polyester resin should be selected with respect to its relative reactivity. For example, diallyl phthalate is particularly useful alone or in conjunction with other allyl esters or styrene, particularly substituted styrenes. Due to the relative reactivity of monomeric styrene, it is inadvisable to use this material alone with unsaturated alkyd resins, as the degree of control required to effect the proper gellation is relatively critical, and no apparent enhancement of properties is obtained which would warrant the control necessary. However, styrene, modified or used in conjunction with other materials, such as the allyl esters, particularly diallyl phthalate, is quite satisfactory in practicing the process involved in this invention.

In the selection of a solvent suitable for utility according to the teachings of this invention, it is desirable to select a solvent which has no affinity for the peroxide catalysts. Accordingly, alcohols, ketones, and other oxygenated solvents, which may react with the peroxide catalyst, should be avoided, whereas esters, saturated hydrocarbons, both chlorinated and aliphatic, and the like, are respresentative of materials which are satisfactory in practicing this invention. Care should be exercised, however, in selecting one of this group, to insure that the solubility for the resins in the solvent is sufficiently great to produce an homogeneous material under reaction conditions. As such, hydrocarbons in general are not the preferred solvents for these resins, but they offer a utility in employing a solvent comprising mixtures of suitable solvents, of which hydrocarbons may be a component. The concentration of any one solvent or mixture thereof used in the preparation of the dispersions of this invention, will be determined by the reactivity of the resin solution to the peroxide catalysts. For example, an ethyl acetate solution of the reaction product of 3.6 mols of ethylene glycol, 3 mols diethylene glycol, 4 mols of fumaric acid, and 2 mols of phthalic anhydride, admixed in the ratio of 4 parts of the reaction product with 1 part of diallyl phthalate, reacts smoothly and rapidly to effect the desired gellation when a 60% solution is employed. However, by increasing the solution to only 66%, the reaction is too rapid for practical control purposes, and when the concentration was reduced to a 50% solution, the reaction was relatively smooth, but the rate of reaction was substantially retarded. A benzoyl peroxide catalyst concentration of 0.125% peroxide based on resin weight was used in all solutions.

Any material which normally induces polymerization of this type resin can be adapted to the process of this invention; it being preferred, however, to employ peroxide catalysts. The optimum reaction conditions are modified in some degree by the choice of the particular catalysts used in the process. A very active catalyst should be used in lower concentrations, and preferably at lower temperatures, than the less reactive materials. The choice of catalyst concentration appears to be quite important, as only sufficient catalyst to induce polymerization without supplying the urgency to complete polymerization should be employed. Concentrations of 0.05% peroxide on a resin basis is useful. However, .125% perioxide based on the resin weight appears to be the optimum or most practical quantity catalyst. Concentrations outside this range can be used, and the process will be effected by such changes to a considerable extent. However, satisfactory results have been obtained with catalyst concentrations up to 1.0%. As examples of the catalysts of the type which are satisfactory in practicing this invention there may be mentioned: tertiary butyl hydroperoxide, caprylyl peroxide, lauroyl peroxide, urea peroxide, tertiary butyl perbenzoate, benzoyl peroxide, and the like. When employing benzoyl peroxide as a catalyst, preferably in a concentration of .125% peroxide based on the resin weight, and employing a solution of one part diallyl phthalate and 4 parts of the reaction mixture of 3.6 mols ethylene glycol, 3.0 mols diethylene glycol, 4.0 mols of fumaric acid, and 2.0 mols phthalic anhydride, in a 60% ethyl acetate solution, a preferred temperature of operation is between 77°–80° C. It is fortunate in employing ethyl acetate which has a boiling point of 78° C. in the process employing resins of this type, since a 2° C. change in temperature sharply modifies the time consumed for gellation to proper degree.

In selecting a solvent, the boiling point is not necessarily a modification on its use. There appears to be no heat of reaction of such magnitude, that the cooling effect of reflux is essential to the process. However, it is desirable that the reaction temperature and boiling point of solvent be such that the solvent is not vaporized or evaporated prior to completion of the desired degree of polymerization of the resin, and yet the boiling point of the solvent should be sufficiently low as to not seriously inhibit its volatization prior to or during pressing of the gel in the final finishing step.

The gel dispersions may be prepared in a wide range of viscosities. For commercial applications the preferred viscosities of the gelled dispersion is within the range of 300–800 poises. However, viscosities within the range of 50–300 poises have value in some practical applications; and, in fact, a product within 5–50 poises demonstrates the value of gel dispersions. When viscosities are in excess of 800 poises, it produces definite limitations in amount of solvent that must be added to make the gelled dispersion of practical value. However, these high viscosity gelled dispersions which are dispersible in solvents are entirely reasonable, and are intended to be included within the scope of this invention. From a practical view point, a gel dispersion of 1500 poises appears to be the upper limit of operability of the gelled dispersions, thought not a theoretical limit.

In order to more fully and accurately describe the invention, the following examples are given wholly by way of illustration, and are not to be construed as limitations in any manner.

EXAMPLE 1

A solution of 50 parts ethyl acetate and 50 parts of a mixture of an unsaturated polyester resin containing monomeric diallyl phthalate (Resin A) was heated to reflux, accompanied by rapid agitation, in the presence of 0.125% benzoyl peroxide based on weight of resin. In approximately 1½ hours, gellation occurred suddenly, as evidenced by sudden thickening of the mass. At this point, 0.01% hydroquinone (in the form of a 5% solution in diallyl phthalate) based on the weight of resin was added, and the reaction mixture was then cooled. The final product was a smooth liquid dispersion of gel consistency.

EXAMPLE 2

Example 1 was repeated, with the exception that 0.063% benzoyl peroxide was used, in lieu of 0.125% used in Example 1. Gellation occurred after one hour and forty-five minutes of reflux. The product obtained in this manner, was similar to that obtained in Example 1, with the exception, however, that it was slightly less viscous.

EXAMPLE 3

A solution of 50 parts of ethyl acetate and 50 parts of a mixture of unsaturated polyester resins containing monomeric diallyl phthalate and styrene (equal parts Resin A and Resin D) was heated to reflux, accompanied by mechanical agitation in the presence of 0.065% benzoyl peroxide. In approximately 1½ hours, gellation occurred suddenly. The batch was then stabilized with 0.01% hydroquinone, as described in Example 1, and cooled rapidly. The final product was a smooth dispersion having a viscosity of approximately 6 poises, as measured by a Brookfield viscosimeter.

EXAMPLE 4

A solution of 33 parts of ethyl acetate and 67 parts of an unsaturated polyester resin containing monomeric diallyl phthalate (Resin A) was heated to reflux, accompanied by mechanical agitation, in the presence of a 0.065% benzoyl peroxide. In approximately one hour gellation occurred rapidly, and the batch assumed, almost immediately, the form of a lumpy gel-like paste. It was cooled rapidly and stabilized with 0.10% hydroquinone, and then passed through a paint mill. After two passes through the paint mill, the mixture was a smooth liquid dispersion.

EXAMPLE 5

A solution of 50 parts of ethylene dichloride and 50 parts of an unsaturated polyester resin containing monomeric diallyl phthalate (Resin A) was heated to reflux and rapidly mechanically agitated in the presence of 0.063% benzoyl peroxide. In approximately one hour and forty-five minutes, gellation occurred rapidly, and the batch was then stabilized with 0.01% hydroquinone. The product obtained in this manner was rather lumpy, but after passing through a paint mill, a smooth liquid dispersion was obtained.

EXAMPLE 6

A solution of 50 parts ethyl acetate, and 50 parts of an unsaturated polyester resin containing 0.5% diallyl phthalate (Resin C) was heated to reflux under rapid mechanical agitation in the presence of 0.25% benzoyl peroxide. Gellation occurred quite suddenly after about one and one-half hours of reflux. Heating and agitation were conducted for an additional 40 minutes, and the batch was then cooled, and 180 parts of monomeric diallyl phthalate were added. The final dispersion was a smooth dispersion of paste-like consistency which was stabilized with 0.01% hydroquinone.

EXAMPLE 7

A solution of 40 parts of ethyl acetate and 60 parts of an unsaturated polyester resin containing monomeric diallyl phthalate (Resin A) was heated to reflux at 77°–79° C., accompanied by violent mechanical agitation in the presence of 0.125% benzoyl peroxide. After approximately three hours at reflux, gelation occurred quite suddenly, and agitation was continued 30–40 minutes longer while the mixture gradually thickened, after which time 0.04% hydroquinone (5% in diallyl phthalate) was added, and cooling began. After approximately 30 minutes of cooling, the product was of smooth consistency having a viscosity of 450 poises, as measured by a Brookfield viscosimeter.

EXAMPLE 8

To 1000 parts of the product obtained in the above Example 7, there was added, by mechanical agitation, 114 parts of an unsaturated alkyd resin (Resin D) of dissimilar nature to that used in the first preparation. The mixture was quite compatible.

Resin A

Eighty (80) parts of the reaction product of 3.6 mols ethylene glycol, 3 mols of diethylene glycol, 4 mols of fumaric acid and 2 mols phthalic anhydride, were mixed with 20 parts diallyl phthalate to give a solution having a viscosity of 1800 poises.

Resin B

Two (2) parts of the reaction product of 6.3 mols of ethylene glycol, 2 mols of fumaric acid, and 4 mols of adipic acid, were blended with 1 part of styrene to give a solution having a viscosity of 2.6 poises.

Resin C

Ninety-nine and five tenths (99.5) parts of the reaction product of 3.6 mols of ethylene glycol, 3.0 mols of diethylene glycol, 4.0 mols of fumaric acid, and 3 mols of phthalic anhydride were mixed with 0.5 part diallyl phthalate.

Resin D

Six and three tenths (6.3) mols of diethylene glycol, 2.40 mols of fumaric acid, and 2.0 mols of adipic acid were reacted to effect esterification.

The gels of this invention may be properly effected by conducting the alkyd esterification and monomeric blending prior to dispersing in the suitable solvent to provide a solution for partial polymerization; or, in the alternative, the gel product may be conveniently prepared by effecting the esterification and polymerization in the organic solvent by dispersing a mixture of the copolymerizable components, namely: the unsaturated alkyd resin components and the reactive material therein.

The gel product of this invention may be satisfactorily employed in surfacing molded or laminated articles of wood, leather, paper, cloth, pressed wood board, and the like, by techniques of spraying or knife-coating on a surface, and evaporating the solvent therefrom by either high or low temperature drying. The residue to the gelled resin is then subjected to a pressing operation to effect the final surface.

In practicing this invention, other additives such as colorants, pigments, dyes, and the like, may be added at any stage, preferably during the gellation stage, to provide compositions giving resultant colored susfaces.

In order to illustrate more fully one embodiment of the utility of this invention, the following examples are given:

EXAMPLE 9

The product obtained by the process of Example 1 was catalyzed by the addition of 1% benzoyl peroxide based on the weight of resin solids, and sprayed on pressed wood panels by means of a suction spray gun employing 60 pounds line pressure. A spread varying from 14 to 28 grams/square foot wet weight was deposited on these panels. The sprayed resin was dried on the panels in a circulating hot air oven at 40° C.–60° C. for periods of time up to 4 hours. The dried panels were placed against polished chrome plates and pressed for 5 minutes at 105° C.–115° C. at 100 and 150 p. s. i. In all cases, excellent surface finishes were obtained, and there was no excessive flow of the gelled resin dispersion. The above example was repeated by employing the resin of Example 4, and ball milling therewith 45% titanium dioxide based on the weight of solid resin. Excellent pigmented finishes were obtained in this manner.

EXAMPLE 10

The product obtained by the process of Example 7 was catalyzed by the addition of 1% benzoyl peroxide based on solid weight of resin, and sprayed on arcuate ply wood panels according to the technique described hereinabove in Example 9. The total wet resin was 35 grams/square foot. The gelled resin coated wood was dried for 75 minutes at 55° C.–65° C. to remove the solvent. The dried panel was then placed against a polished chrome plate for 10 minutes at 110° C. and 150 p. s. i. An excellent uniform surface finish was obtained in this manner. There was no noticeable flow of the gelled resin on the arcuate contouring during the cure.

EXAMPLE 11

A very light coat of resin obtained by the process of Example 7 was sprayed on an arcuate surface of ply wood, and one ply of 4 mil paper having uniformly distributed fibers of 90% rayon viscose and 10% grass fibers was coated over the surface of the sprayed resin, and an additional coating of resin gel applied thereover. The total wet resin spread was 35 grams. This panel was dried as described in the immediate preceding example, and pressed as there described. An excellent transparent finish was obtained in this manner, wherein the grain of the wood was visible, giving a highly polished appearance thereto.

EXAMPLE 12

A $\frac{1}{18}$" birch veneer was coated on both sides with a melamine-urea-formaldehyde glue with a spread of 15–20 grams wet basis per glue line, and allowed to air dry at room temperature. Positioned adjacent each surface of this glue coated veneer was a similar ply of birch veneer. The upper surface of this assembly was sprayed with the resin of Example 7 and dried for 75 minutes at 55°–60° C. This assembly was pressed with the spray gelled resin surface against a polished chrome plate. The curing time was 20 minutes at 120° C. and 150 p. s. i. The product obtained in this manner was excellently bonded ply wood having a surface finish thereon.

I claim:

1. A process for preparing a liquid dispersion of a stable gelled copolymer which comprises partially copolymerizing 50%–66% of a mixture of (1) an alkyd resin comprising the esterification product of a polyhydric alcohol and an alpha beta unsaturated dicarboxylic acid and (2) a reactive material having a $CH_2=C<$ group and having a boiling point of at least 100° C., in the presence of 34% to 50% of a volatile inert organic solvent and a polymerization catalyst, agitating said mixture, solvent and catalyst until the mixture has gelled and a viscosity of 300 to 800 poises has been obtained, thereafter stabilizing the gelled copolymer by the addition of a polymerization inhibitor.

2. A process for preparing a liquid dispersion of a stable gelled copolymer which comprises partially copolymerizing 50%–66% of a mixture of (1) an alkyd resin comprising the esterification product of a polyhydric alcohol and an alpha beta unsaturated dicarboxylic acid and (2) diallyl phthalate in the presence of 34% to 50% of a volatile inert organic solvent and a polymerization catalyst, agitating said mixture, solvent and catalyst until the mixture has gelled, thereafter stabilizing the gelled copolymer by the addition of a polymerization inhibitor.

3. A process for preparing a liquid dispersion of a stable gelled copolymer which comprises partially copolymerizing 50–66% of a mixture of (1) an alkyd resin comprising the esterification product of a polyhydric alcohol and an alpha beta unsaturated dicarboxylic acid and (2) diallyl phthalate, in the presence of 34–50% of a volatile inert organic solvent and a polymerization catalyst, agitating said mixture, solvent and catalyst until the mixture has gelled and a viscosity of 300–800 poises has been obtained, thereafter stabilizing the gelled copolymer by the addition of a polymerization inhibitor.

4. A process for preparing a liquid dispersion of a stable gelled copolymer which comprises partially copolymerizing 60% of a mixture of (1) an alkyd resin comprising the esterification product of a polyhydric alcohol and an alpha beta unsaturated dicarboxylic acid and (2) a reactive material having a $CH_2=C<$ group and having a boiling point of at least 100° C., in the presence of 40% of a volatile inert organic solvent and a polymerization catalyst, agitating said mixture, solvent and catalyst until the mixture has gelled and a viscosity of 300–800 poises has been obtained, thereafter stabilizing the gelled copolymer by the addition of a polymerization inhibitor.

5. A process for preparing a liquid dispersion of a stable gelled copolymer which comprises partially copolymerizing 50–66% of a mixture of (1) an alkyd resin comprising the esterification product of a polyhydric alcohol and an alpha beta unsaturated dicarboxylic acid and (2) an unsaturated diester of a dicarboxylic acid and allyl alcohol having a boiling point of at least 100° C., in the presence of 34–50% of a volatile inert organic solvent and a polymerization catalyst, agitating said mixture, solvent and catalyst until the mixture has gelled and a viscosity of 300–800 poises has been obtained, thereafter stabilizing the gelled copolymer by the addition of a polymerization inhibitor.

6. A process for preparing a liquid dispersion of a stable gelled copolymer which comprises partially copolymerizing 50–66% of a mixture of (1) an alkyd resin comprising the esterification product of a polyhydric alcohol and an alpha beta unsaturated dicarboxylic acid and (2) a reactive material having a $CH_2=C<$ group and having a boiling point of at least 100° C., in the presence of 34–50% of ethyl acetate and a polymerization catalyst, agitating said mixture, solvent and catalyst until the mixture has gelled and a viscosity of 300–800 poises has been obtained, thereafter stabilizing the gelled copolymer by the addition of a polymerization inhibitor.

7. A process for preparing a liquid dispersion of a stable gelled copolymer which comprises partially copolymerizing 50–66% of a mixture of (1) an alkyd resin comprising the esterification product of a polyhydric alcohol and an alpha beta unsaturated dicarboxylic acid and (2) diallyl phthalate, in the presence of 34–50% of ethyl acetate and a polymerization catalyst, agitating said mixture, solvent and catalyst until the mixture has gelled and a viscosity of 300–800 poises has been obtained, thereafter stabilizing the gelled copolymer by the addition of a polymerization inhibitor.

8. A process for preparing a liquid dispersion of a stable gelled copolymer which comprises partially copolymerizing 60% of a mixture of (1) an alkyd resin comprising the esterification product of a polyhydric alcohol and an alpha beta unsaturated dicarboxylic acid and (2) diallyl phthalate, in the presence of 40% of a volatile inert organic solvent and a polymerization catalyst, agitating said mixture, solvent and catalyst until the mixture has gelled, thereafter stabilizing the gelled copolymer by the addition of a polymerization inhibitor.

9. A process for preparing a liquid dispersion of a stable gelled copolymer which comprises partially copolymerizing 50–66% of a mixture of (1) an alkyd resin comprising the esterification product of a polyhydric alcohol and an alpha beta unsaturated dicarboxylic acid and (2) diallyl phthalate, in the presence of 34-50% of ethyl acetate and a polymerization catalyst, agitating said mixture, solvent and catalyst until the mixture has gelled, thereafter stabilizing the gelled copolymer by the addition of a polymerization inhibitor.

10. A liquid dispersion of a stable gelled copolymer prepared according to the process set forth in claim 1.

11. A liquid dispersion of a stable gelled copolymer prepared in accordance to the process set forth in claim 2.

EDWIN H. DAFTER, Jr.

REFERENCES CITED

The following references are of record in the file of this patent:

UNITED STATES PATENTS

| Number | Name | Date |
|---|---|---|
| 1,922,272 | Bender | Aug. 15, 1933 |
| 2,057,766 | Brubaker | Oct. 20, 1936 |
| 2,318,959 | Muskat et al. | May 11, 1943 |
| 2,361,019 | Gerhart | Oct. 24, 1944 |
| 2,409,633 | Kropa | Oct. 22, 1946 |
| 2,429,060 | Hoover et al. | Oct. 14, 1947 |

OTHER REFERENCES

Kropa et al.: pp. 1512-1516, Ind. and Eng. Chem., Dec. 1939.

Rust: pp. 64-67, Ind. and Eng. Chem., Jan. 1940.